United States Patent
Cardenas et al.

(10) Patent No.: US 12,314,772 B2
(45) Date of Patent: May 27, 2025

(54) VARIABILIZED DEPLOYMENT AND MANAGEMENT OF CLOUD-BASED ENVIRONMENTS

(71) Applicant: State Farm Mutual Automobile Insurance Company, Bloomington, IL (US)

(72) Inventors: Karl A. Cardenas, Scottsdale, AZ (US); Michael Brux, Mesa, AZ (US); Todd D. Wigginton, Mesa, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 524 days.

(21) Appl. No.: 17/701,285

(22) Filed: Mar. 22, 2022

(65) Prior Publication Data
US 2022/0300340 A1 Sep. 22, 2022

Related U.S. Application Data

(60) Provisional application No. 63/164,419, filed on Mar. 22, 2021.

(51) Int. Cl.
*G06F 9/50* (2006.01)

(52) U.S. Cl.
CPC .......... *G06F 9/5072* (2013.01); *G06F 9/5016* (2013.01); *G06F 9/505* (2013.01)

(58) Field of Classification Search
CPC ...... G06F 9/5072; G06F 9/5016; G06F 9/505; G06F 9/5005
See application file for complete search history.

(56) References Cited

U.S. PATENT DOCUMENTS

| | | | |
|---|---|---|---|
| 9,935,825 B2 | 4/2018 | Aswathanarayana et al. | |
| 9,935,959 B2 | 4/2018 | Keith et al. | |
| 10,503,493 B2 | 12/2019 | Narayanan et al. | |
| 10,776,178 B2 | 9/2020 | Hargrove et al. | |
| 11,190,399 B2 | 11/2021 | Kabbinale et al. | |
| 2004/0210591 A1* | 10/2004 | Hirschfeld | G06F 16/188 |
| 2005/0183128 A1* | 8/2005 | Assayag | H04N 17/06 725/105 |

(Continued)

*Primary Examiner* — Tuan C Dao
(74) *Attorney, Agent, or Firm* — Lee & Hayes, P.C.

(57) ABSTRACT

Techniques described herein relate to creating and managing groups of cloud-based environments. An interface may be provided through which operators can provide environment configuration variables and request creation and deployment of cloud computing environments. The operator may provide configuration variables via the interface for the requested environment, and the configuration variables may be integrated into pre-existing templates for the organization compliant with a cloud provisioning system. Separate project spaces may be created and conditioned to generate different cloud environments, and infrastructure as code (IaC) configuration files or other executable software based on the variabilized templates may be stored in a project space. A continuous integration and deployment pipeline may be executed to invoke the cloud provisioning system to execute the IaC configuration files within the project space, to provision the requested cloud computing environment within a cloud of a cloud service provider.

20 Claims, 6 Drawing Sheets

(56) References Cited

U.S. PATENT DOCUMENTS

| | | | | |
|---|---|---|---|---|
| 2014/0047079 | A1* | 2/2014 | Breternitz | G06F 9/5072 |
| | | | | 709/220 |
| 2015/0052517 | A1* | 2/2015 | Raghu | H04L 67/10 |
| | | | | 718/1 |
| 2016/0342787 | A1* | 11/2016 | Wang | G06F 21/552 |
| 2017/0046531 | A1* | 2/2017 | Roberts | H04L 9/00 |
| 2018/0356989 | A1* | 12/2018 | Meister | G06F 3/062 |
| 2019/0188315 | A1* | 6/2019 | Hsieh | G06F 16/13 |
| 2019/0392001 | A1* | 12/2019 | Carothers | G06N 3/049 |
| 2020/0027210 | A1* | 1/2020 | Haemel | G06F 9/547 |
| 2020/0264897 | A1* | 8/2020 | Popo | G06F 9/45558 |
| 2020/0327371 | A1* | 10/2020 | Sharma | H04L 67/562 |
| 2020/0387357 | A1* | 12/2020 | Mathon | G06F 9/4411 |
| 2020/0403886 | A1* | 12/2020 | Chandrashekar | H04L 41/5048 |
| 2022/0197713 | A1* | 6/2022 | Sivaramakrishnan | |
| | | | | G06F 9/5027 |

\* cited by examiner

VARIABILIZED DEPLOYMENT AND MANAGEMENT OF CLOUD-BASED ENVIRONMENTS

RELATED APPLICATIONS

This application claims priority to and is a non-provisional of U.S. Patent Application No. 63/164,419, filed Mar. 22, 2021, and entitled "VARIABILIZED DEPLOYMENT AND MANAGEMENT OF CLOUD-BASED ENVIRONMENTS," the disclosure of which is incorporated by reference herein in its entirety for all purposes.

BACKGROUND

Organizations may use cloud (or cloud-based) computing environments rather than on-premise computing solutions to provide improved flexibility, scalability, and access to a wide range of cloud services. To deploy and manage cloud computing environments, a cloud computing network may provide cloud services and/or other computing resources via remote cloud servers, including computing infrastructure applications, network functionality, and data resources. Cloud services may include Software-as-a-Service (SaaS), Infrastructure-as-a-Service (IaaS), and Platform-as-as-Service (PaaS), which may be delivered via public, private, and/or hybrid cloud implementations. In addition to the increased flexibility and scalability and cloud environments, cloud services also may provide customer organizations with increased security, system reliability, seamless provisioning and updates, as well as lower costs for software licenses, computer hardware infrastructures, and maintenance personnel.

However, building, deploying, and configuring cloud computing environments often includes time-consuming and labor-intensive technical processes. For example, to create and deploy a cloud-based environment, a cloud deployment engineer or other operator within the organization may initially create an account at the cloud service provider which will host the cloud environment. The operator may then perform separate processes to attach the environment to the organization, create a name for the environment, set access permissions, aliases and contact information associated with the environment. Additionally, the operator may define the set of network constructs for the environment, create and define roles associated with the account, implement logging capabilities, encryption, and/or any additional organization-specific controls or automated processes required for the cloud environment. Each of these steps may include manual operations that must be performed by engineers and/or other operators of the organization with sufficient technical expertise and organizational experience. These steps also must be initiated, completed, and verified in a preestablished order to successfully deploy the environment within the cloud.

Several automated tools have been developed to expedite the creation and deployment of cloud-based environments. For example, cloud provisioning systems and tools may use configuration files and/or modules representing predefined cloud environments and configuration states for desired cloud deployments. Certain cloud provisioning tools may use executable software (e.g., infrastructure as code configuration files) that invokes the cloud service provider and creates the deployed environment. In some cases, executable configuration files and/or modules may be reusable to allow operators to create multiple identical copies of a cloud deployment. However, when deviations or updates are required for a deployed environment, conventional tools may require the executable configuration files/modules to be copied and pasted, and/or manually updated. Manual updates to infrastructure as code configuration files and other executable software can be error-prone and produce unintended inconsistencies between different copies of deployed environments.

Additionally, many large organizations may build and deploy hundreds or thousands of cloud environments with similar or identical infrastructures and configurations. For instance, different product development teams within an organization may use separate cloud deployments so that each team can work independently and make update to specific components without effecting the components controlled by other development teams. Additionally, organizations may generate separate deployments for different types/functions of environments, such as different deployments for research environments, test environments, and production environments. Such environments may require a set of commonly provisioned and configured cloud components, but also may require separate network constructs, services, and automation that enforce different security protocols, logging capabilities, etc. Further, when the policies or personnel of the organization change, certain changes may require time-consuming manual updates to each of the accounts and deployed environments created by the organization.

SUMMARY

To address these and other problems and inefficiencies, this disclosure describes systems and techniques for creating and managing related groups of cloud-based environments. In some examples, an interface may be provided through which operators of an organization may request creation and deployment of cloud (or cloud-based) computing environments. The operator may provide variable data identifying a unique configuration for the requested environment, and the variable data may be integrated into pre-existing templates for the organization compliant with a cloud provisioning system. Separate project spaces may be created and conditioned to generate different cloud-based environments, and executable software (e.g., infrastructure as code (IaC) configuration files) based on the variabilized templates may be stored in a project space. A continuous integration and continuous deployment pipeline may be executed to invoke the cloud provisioning system to execute the IaC configuration files within the project space, to provision the requested cloud computing environment within a cloud of a cloud service provider.

In an example of the present disclosure, a method includes receiving, by a computer system, first data via an interface, and determining, by the computer system, a cloud environment template, based on the first data. The method also includes receiving, by the computer system, second data via the interface, and updating, by the computer system, the cloud environment template into an updated cloud environment template, based on the second data. The method in this example further includes receiving, by the computer system, a command via the interface to provision a cloud-based computing environment associated with the updated cloud environment template. Additionally, the method includes generating a plurality of executable files associated with a cloud environment provisioning system, based at least in part on the updated cloud environment template, and executing a containerized application to deploy the cloud-based computing environment, via a cloud service provider, wherein the containerized application is configured to execute the plurality of executable files.

In another example of the present disclosure, a computer system comprises one or more processors, and one or more non-transitory computer-readable media storing computer-executable instructions that, when executed by the one or more processors, cause the one or more processors to perform various operations. The operations in this example include receiving first data via an interface, and determining a cloud environment template based on the first data. The operations in this example further include receiving second data via the interface, and updating the cloud environment template based on the second data, to create an updated cloud environment template. Additionally, the operations in this example include receiving a command via the interface to provision a cloud-based computing environment associated with the updated cloud environment template, and in response to receiving the command, executing an application configured to deploy the cloud-based computing environment, via a cloud service provider, based on the updated cloud environment template.

Yet another example of the present disclosure includes one or more non-transitory computer-readable media storing instructions executable by a processor, wherein the instructions, when executed, cause the processor to perform various operations. The operations in this example include receiving first data via an interface, and determining a cloud environment template based on the first data. The operations in this example further include receiving second data via the interface, and updating the cloud environment template based on the second data, to create an updated cloud environment template. Additionally, the operations in this example include receiving a command via the interface to provision a cloud-based computing environment associated with the updated cloud environment template, and in response to receiving the command, executing an application configured to deploy the cloud-based computing environment, via a cloud service provider, based on the updated cloud environment template.

DETAILED DESCRIPTION

Figure 1:
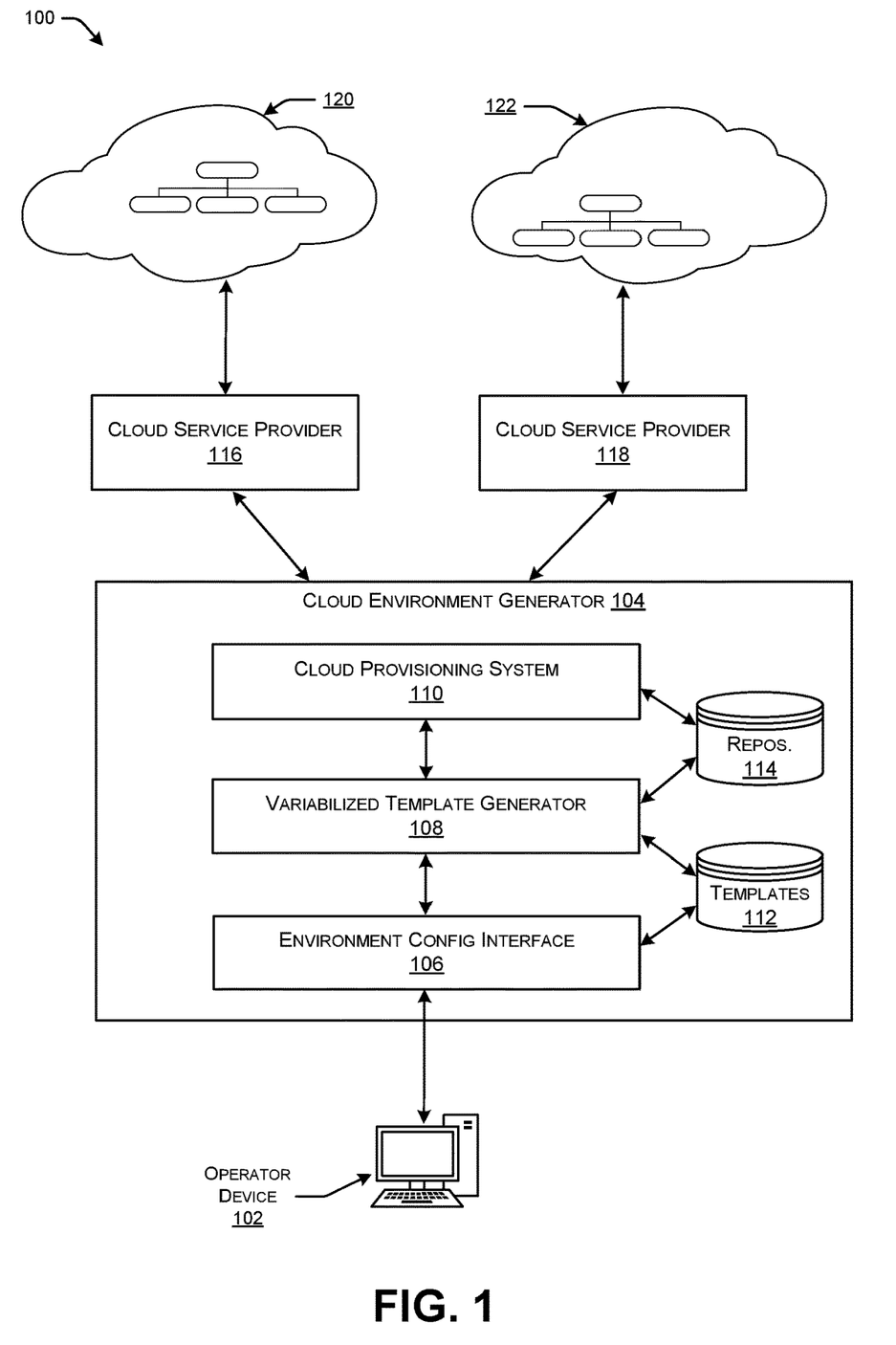
FIG. 1 illustrates a computing environment including a cloud environment generator configured to create and deploy cloud environments based on configuration variable data provided via an interface, in accordance with one or more examples of the present disclosure.

FIG. 1 illustrates an example computing environment 100 for creating and deploying cloud environments. In this example, the computing environment 100 includes an operator device 102 associated with an organization for which cloud environments are to be created, provisioned, and managed. The operator device 102 may be controlled by a deployment engineer or other operator associated with the organization and may be implemented using, for example, a desktop or laptop computer, tablet computer, mobile device, or any other computing device. The operator device 102 may include network interfaces and functionality capable of accessing the cloud environment generator 104, and client software configured to access interface(s) provided by the cloud environment generator 104. The cloud environment generator 104 may be implemented using various different computing architectures, including one or more computing devices, servers, and/or other computing systems. As described below, the cloud environment generator 104 may include computing components configured to provide one or more interface(s), receive cloud environment configuration variables from the operator device 102, create and deploy cloud environments using one or more cloud service providers.

In this example, the cloud environment generator 104 includes an environment configuration interface 106, a variabilized template generator 108, and a cloud provisioning system 110. As shown in FIG. 1, the environment configuration interface 106 may be accessible by the operator device 102 and/or other authorized client devices associated with the organization. In some examples, the operator device 102 may execute a thin, web-based client (e.g., Internet browser) to access the environment configuration interface 106 via a secure network. Additionally or alternatively, the environment configuration interface 106 may include a thick client in which some or all of the interface functionality may execute on the operator device 102. The environment configuration interface 106 may include a graphical user interface (GUI), such as web browser-based or application-based interface through which the cloud environment generator 104 may request environment configuration data and the operator may provide the requested data. For instance, various user interfaces may be provided that are configured to receive organization-specific and/or project-specific configuration variables, such as an organization name, project name, network constructs, administrator names, and/or deployment environment type (e.g., research, test, or production). Additionally, the user interfaces described herein may be configured to receive general cloud deployment configuration variables, such as the cloud provider, region, tenant identifier, etc. In some examples, a GUI need not be implemented and the environment configuration interface 106 may correspond to a programmatic interface (e.g., API) or other non-graphical interface.

The environment configuration interface 106 may include any interface through which the cloud environment generator 104 receives one or more cloud environment configuration data (e.g., configuration variables) from an operator of the organization. The configuration variables may include any data associated with a configuration (and/or any other attribute) of a cloud deployment. For instance, configuration variables may include any selection made by operator or any input provided during the creation, configuration, and/or deployment of a cloud environment. Examples of configuration variables may include, but are not limited to, account names and/or alias associated with the environment, the organizations and/or projects associated with the environment, and contact information associated with the environment (e.g., administrator(s), email addresses, etc.). Additional examples of configuration variables may include the type/functionality of the environment (e.g., production or non-production), aprrnd roles associated with the account (e.g., identification of administrators, product developers, etc.). Additional configuration variables may include the specifications for network constructs to be used in the environment, such as the IP addresses and/or configuration data of the virtual private network, routing tables, routing rules, security policies/groups, and/or network access controllers associated with the environment. Additional examples of configuration variables may include data identifying the cloud service provider and/or cloud region for the environment, the continuous integration and continuous deployment (CI/CD) pipeline associated with the environment, the encryption component(s) to be used within the environment, the logging component(s) to be used, and/or any other automation components tools, or services to be used in the environment. It can be understood from the context of this disclosure that the examples of configuration variables described herein are illustrative and non-limiting, and that any attribute of a cloud deployment/environment may be represented as configuration variable in some examples.

As noted above, many organizations may create and deploy different cloud environments having similar or identical infrastructures and/or configurations. For instance, a large organization may deploy hundreds or thousands of nearly identical cloud environments for use by different product development teams, within different cloud regions, and/or for different purposes (e.g., production, research, testing, etc.). In such instances, a majority of the cloud infrastructure and cloud configuration data may be the same across the different cloud environments. However, a small amount of the configuration data may be different in different cloud environments, such as differences in account names, project names, account aliases and contact information, access permissions, security/network configuration settings, IP address, and the like. The configuration data that varies between different cloud environments associated the same organization may be referred to as variable data. In some examples, the environment configuration interface 106 may include an interface configured to receive only the variable data from the operator, and need not include fields to receive any non-variable infrastructure specifications and/or configuration data that does not change between different cloud environments of the organization.

Figure 2:
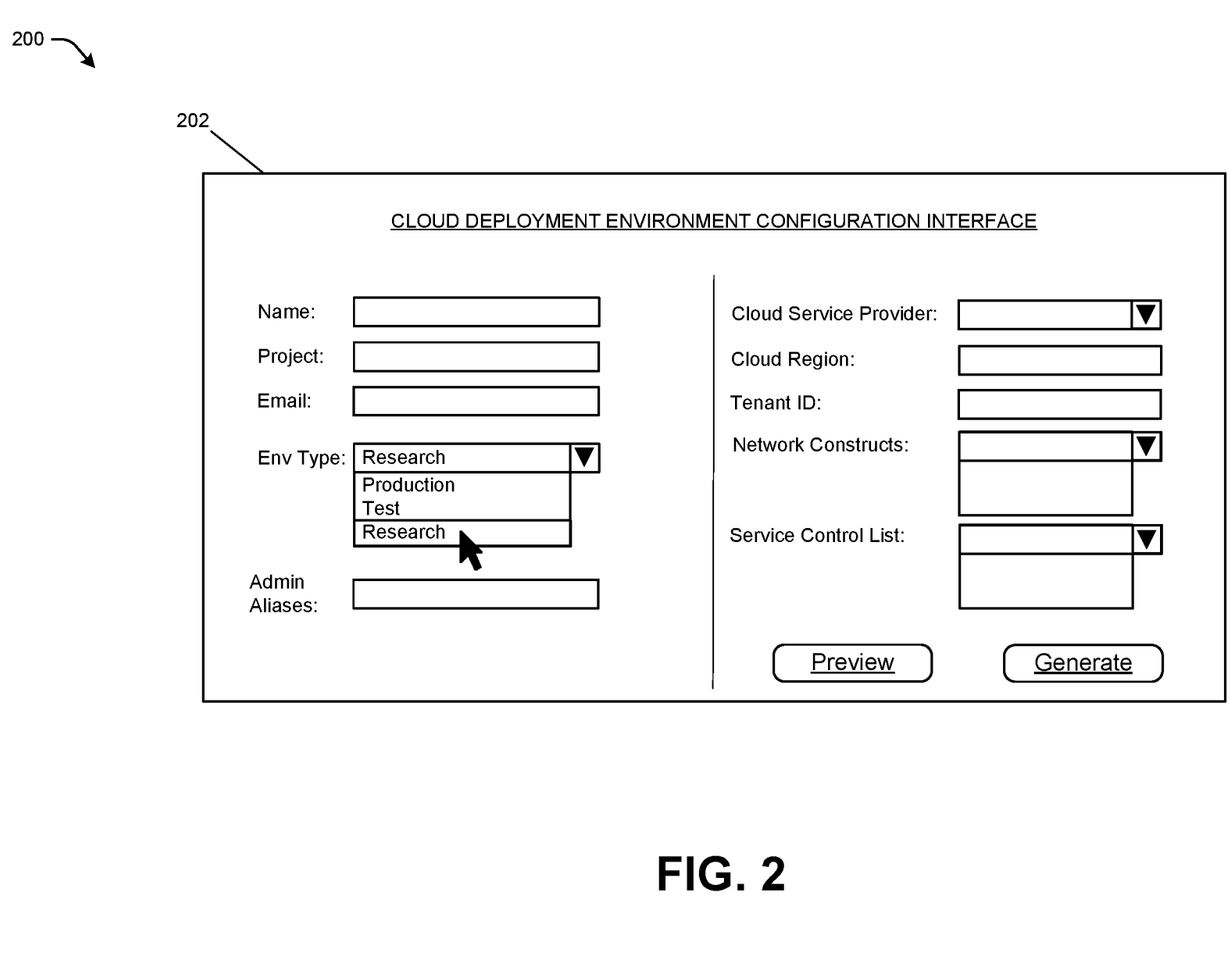
FIG. 2 is a display screen of an example user interface configured to receive environment configuration data from an operator, in accordance with one or more examples of the present disclosure.

For example, referring now to FIG. 2, a GUI 200 is shown corresponding to an environment configuration interface 106 configured to allow operators of an organization to quickly create and provision new cloud environments for the organization. In this example, the current display screen 202 of the GUI 200 includes a number of fields prompting the operator to provide the variable configuration data needed to create and deploy the new environment. As shown in this example, the display screen 202 includes relatively few fields. In this case, it may be assumed that most of the cloud infrastructure and configuration data for creating new cloud environments for this organization are non-variable, and therefore need not be included in the GUI 200. Instead, the GUI 200 may be configured to request and receive only the variable configuration data from the operator that is required to create a new and unique cloud environment for the organization. As shown in this example, the display screen 202 of the GUI 200 may include various user interface fields into which the operator may provide an account name, project name, associated email address, environment type (e.g., Research, Testing, or Production), a listing of authorized credentials and/or administrator aliases associated with the new environment, a cloud service provider for the new environment, a cloud region, a tenant identifier, a listing of network constructs (e.g., IP addresses), and a service control listing.

It can be understood in the context of this disclosure that the variable configuration data used to create and deploy new cloud environments may be different for different organizations. In some examples, the cloud environment generator 104 may provide different customized interfaces for different operators and/or operator devices 102, which are configured to receive environment configuration variables based on the organization for which the new cloud deployment is requested. For instance, the GUI 200 may be associated with a first organization having a predetermined set of variable configuration data. For a second organization having a different set of variable configuration data, the environment configuration interface 106 may provide a different interface to operators. For instance, if the second organization uses the same set of administrators for all cloud deployments and requires all cloud deployments to be created via the same cloud service provider, then a custom interface created for the second organization need not include the "Admin Aliases" field or the "Cloud Service Provider" field shown in the GUI 200. In some cases, the environment configuration interface 106 may determine which fields to include in a GUI or other interface by retrieving templates from the template data store 112 associated with the organization, and using pattern matching to identify the variables within the organization templates. In some examples, various templates (e.g., IaC configuration files) may be defined at the organization level, project level, environment level, and/or the individual level. Any or all of these various templates may be combined, aggregated, and/or resolved to generate specific templates that can be used for the new deployment.

After receiving the variable data via the environment configuration interface 106, the cloud environment generator 104 may use the variabilized template generator 108 to create one or more variabilized templates. For example, the variabilized template generator 108 may retrieve a non-variabilized template from the template data store 112, and incorporate the variable data received via the interface 106 into the template, to make a variabilized template. As used herein, a template (or cloud environment template) may refer to a set of files or other data structures storing data that defines at least a portion of the infrastructure and/or configuration data for a cloud environment. As noted above, organizations may include pre-existing templates defining the specifications of new cloud environments to be created for the organization. In some examples, cloud environment templates may include software instructions that can be directly executed by a cloud provisioning system. For instance, templates may be stored as configuration files (e.g., infrastructure as code (IaC) configuration files) which may be executable and/or used by executable software to create and provision cloud environments.

In some cases, the non-variabilized templates stored in the template data store 112 may include placeholder variables, and the variabilized template generator 108 may use pattern matching to replace the placeholder variables with the corresponding variable data received from the environment configuration interface 106. In such cases, the placeholder variables may have specific unique patterns that identify the placeholders as variables to be replaced, and do not occur within the additional constant environment configuration data in the template. As an example, the placeholder variables in a template may be identified by a hashtag character ("#") followed by the variable name. To generate the variabilized template, the variabilized template generator 108 may use a regular expression tool to find and replace each placeholder variable with the corresponding variable data received from the environment configuration interface 106.

The cloud provisioning system 110 may use the variabilized templates to provision (e.g., create and configure) the requested cloud environment, using one or more cloud service providers 116-118, within the corresponding clouds 120-122. In some examples, the cloud provisioning system 110 may access and/or generate a storage space (e.g., a repository) for templates and/or other executable files corresponding to the requested cloud environment. A repository for a cloud environment may store a combination of the variabilized template(s) generated based on the configuration variable data received from the operator device 102, as well as additional non-variabilized templates associated with the organization, the project, the environment type, and/or the cloud service provider. Repositories corresponding to particular cloud environments, projects, and/or organizations may be stored in a repository data store 114. In some examples, a repository may be associated with a particular project or product development team, and different sub-folders (or other sub-spaces) within the repository may store templates for different environments (e.g., a production environment, various test environments, various research environments, etc.) associated with the project or product development team. In such examples, to create new environment within an existing repository, the cloud provisioning system 110 may retrieve the repository from the repository data store 114, create a new subfolder within the repository, including the required templates within the new subfolder. In some cases, the new environment within the repository may include one or more new variabilized templates, based on the configuration variable data received from the operator device 102 for the new environment.

To provision the requested cloud environment, the cloud provisioning system 110 may execute the templates in the repository, causing cloud provisioning instructions to be transmitted to the appropriate cloud service provider 116 or 118. As noted above, in some examples the templates may include executable code that can be executed directly by the cloud provisioning system 110. For example, templates may include infrastructure as code software instructions using a declarative configuration language in a structured format. To generate and execute templates, the cloud environment generator 104 may use languages including one or more of Terraform® by Hashicorp®, Cloudformation® by AWS®, Azure Resource Manager® by Microsoft Azure®, Cloud Deployment Manager® by Google®, Oracle Orchestration Cloud® by Oracle®, or Ansible® by Redhat®. It can be understood from this disclosure that these structured format languages are non-limiting examples only, and that any other domain-specific language for provisioning cloud deployments may be used in other examples.

In some examples, the cloud provisioning system 110 may execute as a containerized application on the cloud environment generator 104, and/or may use a continuous integration and continuous deployment (CI/CD) pipeline to execute the repositories and provision the cloud environment. For example, the cloud provisioning system 110 may trigger a CI/CD pipeline to execute the configuration templates within a repository, to provision the new cloud environment. The CI/CD pipeline may be integrated natively into a version control system, and may be configured to execute the configuration templates a predetermined execution sequence. Additionally, in some cases the cloud provisioning system 110 may execute multiple CI/CD pipelines in parallel, where each CI/CD pipeline is associated with different repository (or repository subfolder) corresponding to a different cloud environment. As an example, multiple CI/CD pipelines may be executed in parallel to create different cloud environments for research, test, and production at the same time. In some examples, the cloud provisioning system 110 may leverage a clustering solution, in which a single CI/CD pipeline (or multiple CI/CD pipelines) may use different computing devices to perform the cloud provisioning instructions of different templates.

As illustrated by the features and examples in this disclosure, the techniques described herein provide technical advantages that improve the capabilities and functioning of systems performing cloud generation, deployment, and provisioning. In contrast to conventional cloud provisioning systems, the techniques described herein support rapid creating and provisioning of multiple accounts (e.g., multiple cloud environments) for an organization using different configurations. As noted above, large organizations may create many different cloud environments for different product development teams, projects, environment types (e.g., production and non-production), and clouds/regions. In these examples, an operator of the organization can use the environment configuration interface 106 to quickly provide the configuration variables, initiate the generation of variabilized templates, integrate the variabilized templates with other project/organization templates, and trigger a CI/CD pipeline to automatically provision the environment within the cloud. Thus, unlike conventional cloud provisioning systems, the cloud environment generator 104 supports the creation of large groups of related cloud environments having similar configurations, without requiring the operator to copy and paste configuration files and modules, or to manually edit infrastructure as code or other provisioning software files.

Additionally, the techniques described herein provide advantages of using organizational awareness to improve automation of cloud environment provisioning. As described above, the cloud environment generator 104 may create and manage storage spaces such as repositories with hierarchical structures to store provisioning files for different customized production and non-production environments. When a new cloud environment is requested, the cloud environment generator 104 can determine and apply the appropriate environment configuration using templates associated with the organization, project/development team, environment type, and the configuration variables received from the operator. Additionally the repository structure and execution of parallel CI/CD pipelines allow for rapid deployment of new cloud environments, and rapid updating of groups of existing cloud environments associated with the organizational structure.

Further advantages include a common, cloud service provider agnostic, environment configuration interface 106 for creation and management of cloud environments. In some examples, the environment configuration interface 106 allows the operator to select a particular cloud service provider, after which the additional components of the cloud environment generator 104 may retrieve and variabilize the appropriate templates, and provision the cloud environment via the selected cloud service provider. In such examples, neither the operator nor the organization is limited to a single cloud service provider, and an operator/organization changing to a different cloud service provider to create additional cloud environments does not require rewriting provisioning code by technical personnel.

Figure 3:
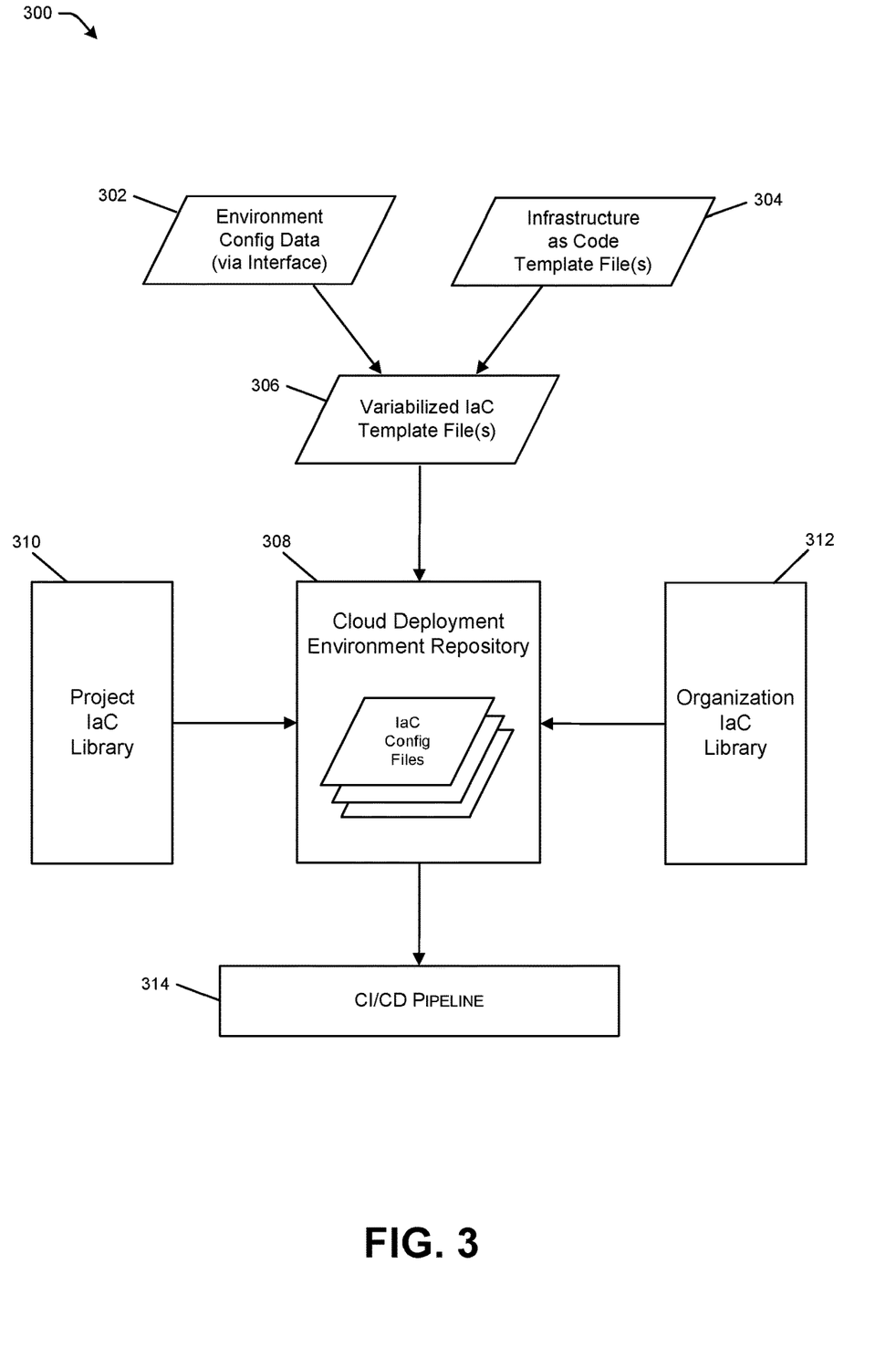
FIG. 3 illustrates an example technique for generating a repository of infrastructure as code (IaC) configuration files corresponding to a cloud environment, and executing the IaC configuration files using a continuous integration and deployment pipeline, in accordance with one or more examples of the present disclosure.

FIG. 3 depicts an example system 300 configured to provision a cloud environment based on environment configuration data received from an organization operator via an interface. In some implementations, the system 300 may be similar or identical to the cloud environment generator 104. However, in this example, additional data elements and features of the system 300 are depicted to illustrate in more detail the techniques described herein for creating and provisioning a cloud environment.

In this example, the system 300 receives environment configuration data 302 via from an operator via one or more interfaces. As described above, the interfaces may include GUIs in some examples, and may include APIs or other programmatic interfaces in other examples. The environment configuration data 302 may correspond to variable configuration data associated with the organization, project, and/or requested environment type. For instance, the environment configuration data 302 may include a limited number of data fields, representing the configuration data that is not fixed and predefined by the organization, the project, and/or based on the selected environment type.

The system 300 may retrieve one or more infrastructure as code (IaC) template file(s) 304, and combine the environment configuration data 302 into the IaC template file(s) 304 to generate the variabilized IaC template files 306. As noted above, generating variabilized template files 306 may include identifying placeholder variables within the template file(s) 304, and then replacing the placeholder variables with data based on the environment configuration data 302 received via the interface. In some examples, a regular expression pattern matching operation may be used to perform a search and replace on the template file(s) 304 to generate the variabilized template files 306. Additionally, although the non-variabilized template files 304 and variabilized template files 306 are IaC files in this example, in other examples any structured file format may be used for cloud environment templates 304 and 306.

In some examples, the system 300 may select and retrieve particular IaC template file(s) 304 based on the environment configuration data 302 received via the interface. For instance, when the operator selects a first environment type via the interface (e.g., a research environment), the system 300 may retrieve a first IaC template file that includes a first set of placeholder variables. However, when the operator selects a different environment type (e.g., a production environment), the system 300 may retrieve a different IaC template file with different of placeholder variables. Additionally, in some examples, the interface may be configured to dynamically update based on the retrieved template file(s), to provide data fields in the interface that correspond to the placeholder variables in the template files.

In this example, the repository 308 represents a cloud deployment environment repository that includes one or more groups (e.g., subfolders) of IaC configuration files. The repository 308 in this example includes a combined set of IaC configuration files from a project IaC library 310, an organization IaC library, and the variabilized IaC template files 306. As noted above, much of the infrastructure and configuration for a requested cloud environment may be non-variable and cannot be selected or configured by the operator. Instead, non-variable cloud infrastructure and configuration data may be determined based on IaC configuration files within the project IaC library 310, and organization IaC library 312. The IaC libraries 310 and 312 each may include configuration files that define the desired configuration(s) of the cloud environment with respect to, for example, the security protocols and access permissions, administrator aliases, roles, logging configuration, encryption configuration, network constructs and configuration, service control listings, and/or organization-specific and project-specific automation tools. Thus, by assembling the repository 308 using a combination of IaC configuration files from a project IaC library 310, an organization IaC library 312, and the variabilized IaC template files 306, the system may support customization of cloud environments based on infrastructure and configuration required applied at the level of the organization, project level, environment type, and/or environment. Additionally or alternatively, customization of cloud environments may be based on the cloud service provider, cloud region, and/or tenant identifier.

The CI/CD pipeline 314 may receive and execute the repository of IaC configuration files to provision the requested cloud environment. In some examples, the CI/CD pipeline 314 may be implemented as a pipeline service within a devops platform, such as (but not limited to) Gitlab CI/CD®) executed by a GitLab Runner® application. The repository of IaC configuration files may be integrated into the devops platform in some examples, or may be stored in a separate storage external to the CI/CD pipeline 314 and associated devops platform/application.

Figure 4:
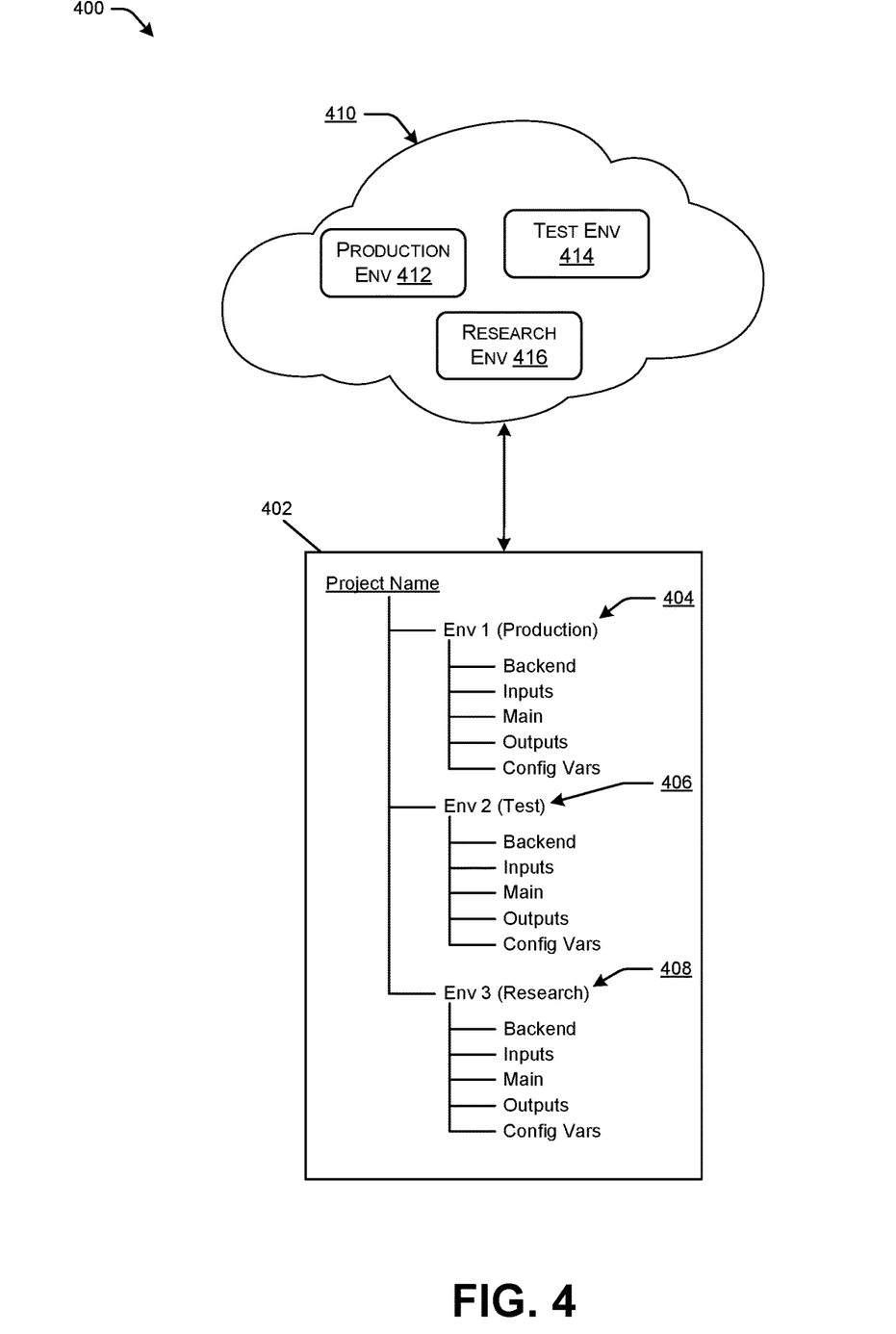
FIG. 4 illustrates an example repository including multiple storage spaces corresponding to different deployed cloud environments, in accordance with one or more examples of the present disclosure.

FIG. 4 shows an environment 400 including an example repository 402 defining multiple cloud environments. In this example, the repository 402 corresponds to a storage space with a hierarchical file directory structure. The repository 402 may contain subfolders of cloud provisioning files (e.g., IaC configuration files) associated with multiple different environments associated with the same organization and/or same project. In this example, the repository 402 includes a first subfolder 404 storing provisioning files for a first cloud production environment for the project, a second subfolder 406 storing a different set of provisioning files for a second cloud test environment for the project, and a third subfolder 408 storing another set of provisioning files for a third cloud research environment for the project. In this example, by modularization the cloud environment of the project, some or all of the configuration files within subfolders 404, 406, and 408 may be identical. For instance, in this example only the backend configuration files and the configuration variables files within subfolders 404, 406, and 408 may be different, while the inputs files, main files, and outputs files may be similar or identical for all subfolders within the repository 402.

In this example, a CI/CD pipeline may be initiated to execute the configuration files based on the repository 402, to create and deploy the cloud environments within one or more clouds 410. As shown in the environment 400, a production environment 412, test environment 414, and research environment 416 have been deployed in the cloud 410 based respectively on the first subfolder 404, the second subfolder 406, and the third subfolder 408. In some examples, a CI/CD pipeline may be triggered each time a new subfolder in the repository 402 is created, or when a subfolder is updated, to create/update the corresponding cloud environment within the cloud 410. As noted above, the CI/CD pipeline may be executed by a containerized application in some instances, and may use a computing cluster to execute different configuration files using different computing devices. In some examples, the application may trigger multiple CI/CD pipelines at the same time, and/or contemporaneously (e.g., during overlapping time windows), in which different CI/CD pipelines are assigned to different subfolders (e.g., different cloud environments), thereby supporting quicker deployment and update operations for groups of cloud environments.

Figure 5:
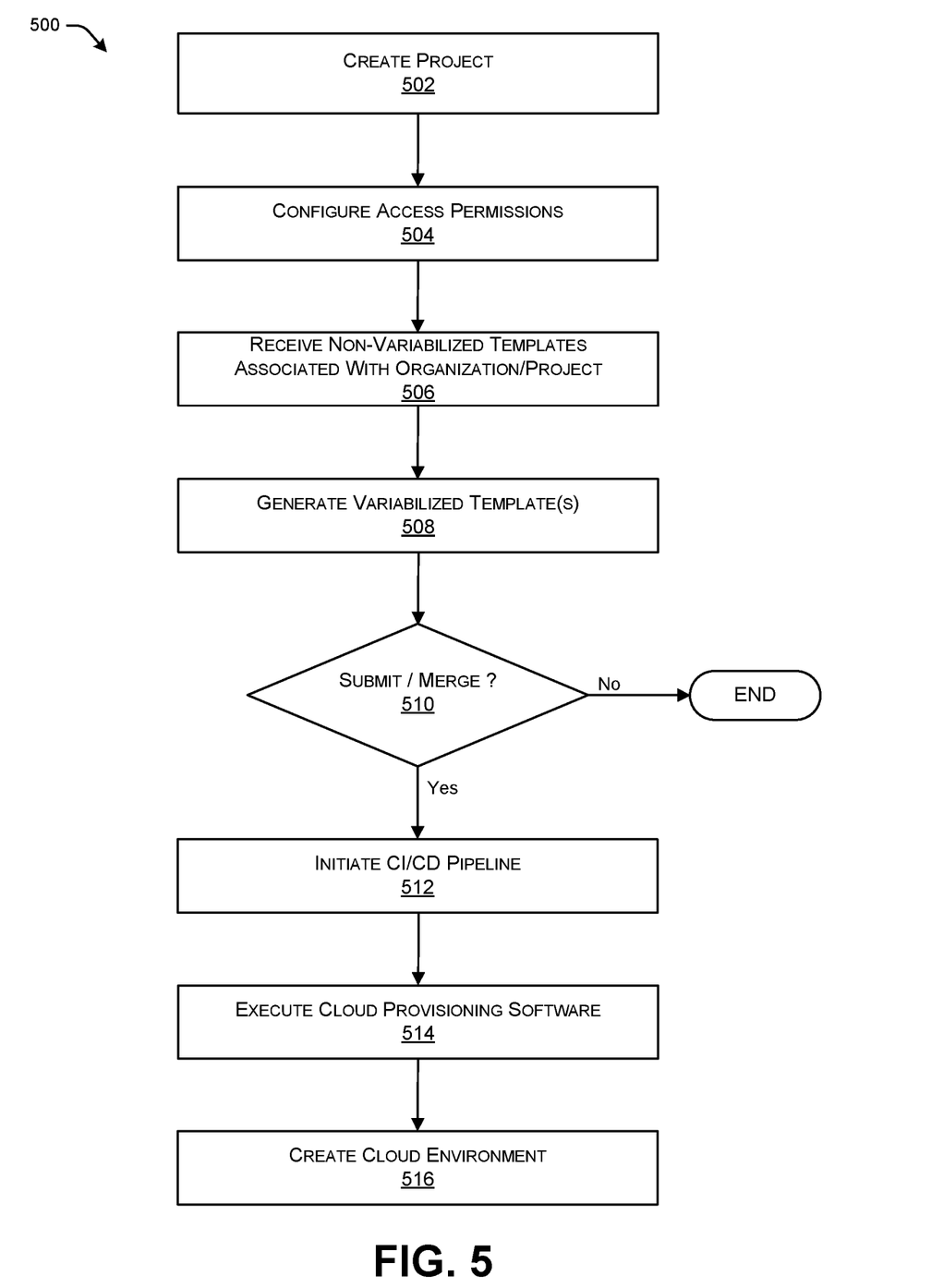
FIG. 5 is a flow diagram illustrating an example process of creating and provisioning a cloud environment based on based on configuration variable data provided via an interface, in accordance with one or more examples of the present disclosure.

FIG. 5 is a flow diagram illustrating a process 500 of creating and provisioning a cloud environment based on based on configuration variable data provided via an interface. For instance, process 500 may be initiated in response to an operator request, received via a client interface, to create and deploy one or more cloud environments for an organization. In some examples, the techniques and operations of process 500 may be performed by a cloud environment generator 104, including or in combination with any of the various components described above in FIGS. 1-4. As described below, in some instances the operations of process 500 may be performed in response to operator input received via an environment configuration interface 106. For example, the operator may input unique environment configuration data, such as a project name, tags, IP addresses, etc., and may submit the data via the interface 106 to initiate operations 502-516.

At operation 502, the cloud environment generator 104 may create a project home within a devops platform (e.g., a GitHub® project). The project may include a repository into which code (e.g., IaC configuration files) may be copied or created. As noted above, in some cases the creation of the project in operation 502 may be performed in response to the submission of environment configuration data from an operator via the interface 106. To create the project, the cloud environment generator 104 may perform an API call to a version control system to create the project home and repository. In some examples, the API call may be performed using JavaScript within the browser executing the environment configuration interface 106, and/or other programming language code executing within a non-browser-based client running the interface 106.

At operation 504, the cloud environment generator 104 may set permissions associated with the project and/or repository. In some examples, operation 504 may include additional API calls (e.g., JavaScript functions within the interface 106) to create team-based permissions associated with the project and/or the cloud environment. For instance, the permissions in operation 504 may be based on the organization, the product development team associated with the project, and/or the environment type to be created (e.g., test, research, or production). Examples of permissions set in operation 504 may include permissions determining whether or not the project is public and/or visible, as well as permissions identifying the admin users/aliases permitted to perform merges of the project in the main branch (e.g., merge approvals, merge approvers, push rules, etc.).

At operation 506, the cloud environment generator 104 may receive one or more non-variabilized templates associated with the organization and/or project. The non-variabilized templates may be generated and maintained by a development team associated with the organization, and may be stored in a template data store 112. The cloud environment generator 104 may retrieve the templates from the template data store 112 based on the cloud environment requested via the interface 106. As noted above, different templates may be associated with different product development teams, different requested environment types, different requested cloud service providers, etc.

At operation 508, the cloud environment generator 104 may generate variabilized templates for the cloud environment, by incorporating the environment configuration data received from the operator via the interface 106, into the non-variabilized templates. As noted above, some or all of the non-variabilized templates received in operation 506 may include placeholder variables, and the cloud environment generator 104 may use pattern matching and text find/replace operations (e.g., using a regular expression engine) to replace the placeholder variables with configuration variables determined based on the data received via the interface 106. Along with the variabilized templates for the cloud environment, the cloud environment generator 104 may retrieve a common set of provisioning files (e.g., IaC configuration files) associated with the project and/or organization. The common set of provisioning files may be preloaded and centrally managed by the development team, and can be added to the newly created repository by copying the files from a template data store 112 or another previously existing subfolder within the repository.

At operation 510, the cloud environment generator 104 may determine whether or not to deploy the requested cloud environment into the cloud. As shown in this example, in some instances creating and deploying the cloud environment may correspond to a merge of the IaC configuration files in the repository, into a main branch associated with the project or organization. For example, operation 510 may include merging any changed template files from a private test/research environment into a main branch used by the organization executing in a public cloud. In some examples, the environment configuration interface 106 may be configured to allow operators to verify a preview of the automation passes before confirming via the interface that the cloud environment is to be deployed (510:Yes), or to cancel or revise the changes to the configuration files in the repository (510:No). If the operator elects not to submit/merge the updated configuration files (e.g., variabilized templates) (510:No), then process 500 may terminate, or alternatively may allow the operator to make additional changes to the environment configuration data via the interface 106, after which operations 502-510 may be re-executed.

If the operator elects to submit and/or merge the updated configuration files (e.g., variabilized templates) (510:Yes), then at operation 512 the cloud environment generator 104 may initiate a CI/CD pipeline, and at operation 514 the cloud environment generator 104 may use the CI/CD pipeline to execute the files created within the repository. Based on the execution of the files within the repository (e.g., IaC configuration files based on the variabilized templates), the cloud provisioning system 110 causes provisioning instructions to be transmitted to one or more cloud service providers in operation 516, deploying the cloud environment. As noted above, in some cases deployment of the cloud environment may correspond to merge of configuration files from the repository into a main branch of the organization within a public cloud environment.

The creation/deployment of the cloud environment in operation 516 may be performed via one cloud service provider or a plurality of cloud service providers. In some examples, the cloud environment generator 104 may support and interface with multiple cloud service providers. Non-limiting examples of cloud service providers that may be used by cloud environment generator 104 may include Amazon Web Services®, Microsoft Azure®, Google Cloud Platform®, and any other public cloud infrastructure. Configuring the cloud environment generator 104 to use different public cloud infrastructures, or a combination of cloud infrastructures, may include corresponding replication and modification of the templates, configuration files, and repositories. However, in some examples the modifications based on the selected public cloud infrastructure may be transparent with respect to the operator, who may either select a public cloud infrastructure via the interface 106 or may use a default public cloud infrastructure without requiring rewriting of the provisioning code or user interface by technical personnel.

Figure 6:
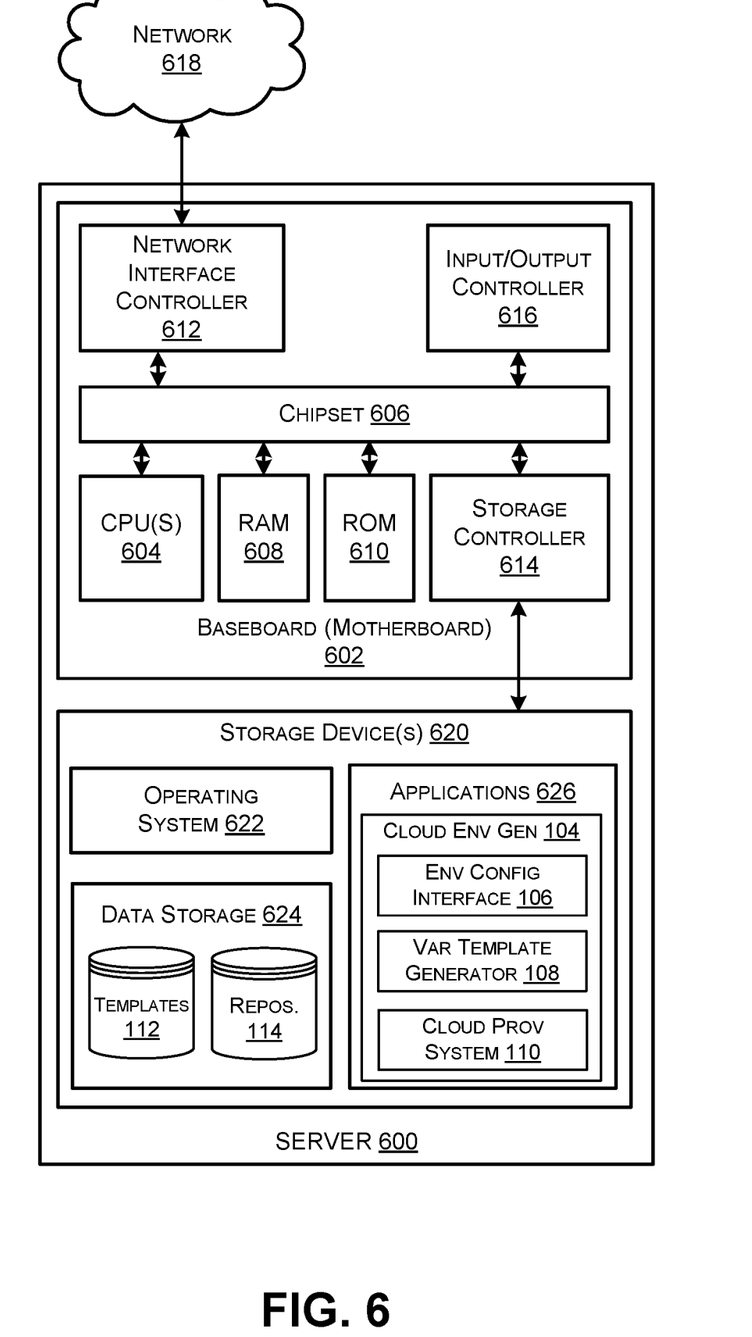
FIG. 6 is an example architecture of a computer server capable of executing program components for implementing various techniques described herein.

FIG. 6 shows an example architecture of a computer server 600 capable of executing program components for implementing the various functionality described herein. Although the computer architecture in this example is labeled as a server, it can be understood from this disclosure that similar or identical computer architectures may be implemented via workstations, desktop or laptop computers, tablet computers, network appliances, mobile devices (e.g., smartphones, etc.) or other computing device, and/or virtual machines or cloud-based computing solutions, any or all of which may execute any combination of the software components described herein. The server 600 may, in some examples, correspond to any of the computing systems or devices described above, such as a cloud environment generator 104, the operator device 102, one or more of the cloud service providers, and/or any other computing devices, systems, or components executing the software components described herein. It will be appreciated that in various examples described herein, a server 600 might not include all of the components shown in FIG. 6, may include additional components that are not explicitly shown in FIG. 6, and/or may utilize a different architecture from that shown in FIG. 6.

The server 600 includes a baseboard 602, or "motherboard," which may be a printed circuit board to which a multitude of components or devices are connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the server 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the server 600. The chipset 606 can further provide an interface to a computer-readable storage medium such as a ROM 610 or non-volatile RAM ("NVRAM") for storing basic routines that help to startup the server 600 and to transfer information between the various components and devices. The ROM 610 or NVRAM can also store other software components necessary for the operation of the server 600 in accordance with the configurations described herein.

The server 600 can operate in a networked environment using logical connections to remote computing devices and computer systems through a network, such as the network 618, which may be similar or identical to any of the communication networks discussed above. The chipset 606 also may include functionality for providing network connectivity through a Network Interface Controller (NIC) 612, such as a gigabit Ethernet adapter. The NIC 612 is capable of connecting the server 600 to other computing devices (e.g., operator devices 102, cloud service providers, etc.) over the network 618. It should be appreciated that multiple NICs 612 can be present in the server 600, connecting the computer to other types of networks and remote computer systems. In some instances, the NICs 612 may include at least on ingress port and/or at least one egress port.

The server 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device.

The server 600 can include one or more storage device(s) 620, which may be connected to and/or integrated within the server 600, that provide non-volatile storage for the server 600. The storage device(s) 620 can store an operating system 622, data storage systems 624, and/or applications 626, which are described in more detail herein. The storage device(s) 620 can be connected to the server 600 through a storage controller 614 connected to the chipset 606. The storage device(s) 620 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server 600 can store data on the storage device(s) 620 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 620 are characterized as primary or secondary storage, and the like.

For example, the server 600 can store information to the storage device(s) 620 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server 600 can further read information from the storage device(s) 620 by detecting the physical states or characteristics of one or more particular locations within the physical storage units.

In addition to the storage device(s) 620 described above, the server 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the server 600. In some examples, the various operations performed by the computing systems described herein (e.g., environment configuration interface 106, variabilized template generator 108, cloud provisioning system 110, etc.) may be implemented within a datacenter including one or more servers or devices similar to server 600. For instance, some or all of the operations described herein may be performed by one or more server 600 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 620 can store an operating system 622 utilized to control the operation of the server 600. In some examples, the operating system 622 comprises a LINUX operating system. In other examples, the operating system 622 comprises a WINDOWS® SERVER operating system from MICROSOFT Corporation of Redmond, Washington. In further examples, the operating system 622 can comprise a UNIX operating system or one of its variants. It should be appreciated that other operating systems can also be utilized. The storage device(s) 620 can store other system or application programs and data utilized by the server 600.

In various examples, the storage device(s) 620 or other computer-readable storage media is encoded with computer-executable instructions which, when loaded into the server 600, transform the computer from a general-purpose computing system into a special-purpose computer capable of implementing various techniques described herein. These computer-executable instructions transform the server 600 by specifying how the CPUs 604 transition between states, as described above. In some examples, the server 600 may have access to computer-readable storage media storing computer-executable instructions which, when executed by the server 600, perform the various techniques described herein. The server 600 can also include computer-readable storage media having instructions stored thereupon for performing any of the other computer-implemented operations described herein.

As illustrated in FIG. 6, the storage device(s) 620 may store one or more data storage systems 624 configured to store data structures and other data objects. In some examples, data storage systems 624 may include one or more data stores, which may be similar or identical to the template data store 112 and/or the repository data store 114 described above. Additionally, the software applications 626 stored on the server 600 may include one or more client applications, services, and/or other software components. For example, application(s) 626 may include any combination of the components 106-110 discussed above in relation to the cloud environment generator 104, and/or other software components described above in reference to FIGS. 1-5.

As illustrated by the above examples, the techniques described herein provide various technical advantages that improve cloud creation and provisioning systems. For example, the techniques described herein improve both the speed and quality of cloud environment creation for organizations that create and deploy large groups of related cloud environments having similar infrastructures and/or configurations. Additionally, the techniques described herein improve automation of cloud environment provisioning and management by incorporating organizational awareness, including creation and management of repositories associated with different development teams and environment types within the organization. Further, these techniques provide additional advantages of a common environment configuration interface 106 that may be cloud service provider agnostic, for creating and managing of cloud environments.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
receiving, by a computer system, data via an interface;
updating, by the computer system, a cloud environment template into an updated cloud environment template, based on the data;
receiving, by the computer system, a first command via the interface to provision a first cloud deployment associated with the updated cloud environment template in a first production environment, and a second command to provision a second cloud deployment associated with the updated cloud environment template in a second non-production environment;
generating a plurality of executable files associated with a cloud environment provisioning system, based at least in part on the updated cloud environment template;
determining a first configuration file based at least in part on a first attribute associated with the first production environment;

determining a different second configuration file based at least in part on a different second attribute associated with the second non-production environment;

executing an application to deploy the first cloud deployment and the second cloud deployment, via a cloud service provider, by:

PERFORMING A FIRST EXECUTION OF THE PLURALITY OF EXECUTABLE FILES USING THE FIRST CONFIGURATION FILE; AND performing a second execution of the plurality of executable files using a second configuration file.

2. The method of claim 1, wherein executing the application comprises:

creating a storage space on the computer system associated with the first production environment;

generating the plurality of executable files within the storage space; and initiating a pipeline configured to execute the plurality of executable files using a predetermined execution sequence.

3. The method of claim 2, further comprising:

receiving a listing of authorized credentials associated with the first production environment; and configuring a set of access permissions associated with the storage space, based on the listing of authorized credentials.

4. The method of claim 1, wherein executing the application comprises:

determining an existing storage space on the computer system associated with the first production environment;

generating a first subfolder within the existing storage space associated with the first production environment;

generating the plurality of executable files within the first subfolder, wherein generating the plurality of executable files comprises copying at least one file from a second subfolder within the existing storage space; and initiating a pipeline configured to execute the plurality of executable files using a predetermined execution sequence.

5. The method of claim 4, wherein the first subfolder is associated with the first production environment, and the first configuration file is associated with a first security policy or a first network construct associated with the first production environment, and wherein the second subfolder is associated with the second non-production environment, and the second configuration file is associated with a second security policy or a second network construct associated with the second non-production environment.

6. The method of claim 4, further comprising:

initiating the pipeline, as a first pipeline, configured to execute the plurality of executable files within the first subfolder on a first computing device; and initiating a second pipeline configured to execute a second plurality of executable files within the second subfolder, on a second computing device, wherein the first pipeline and the second pipeline are configured to execute contemporaneously.

7. The method of claim 1, further comprising:

receiving, via the interface, a selection of the cloud service provider, wherein generating the plurality of executable files is based at least in part on the selected cloud service provider.

8. The method of claim 1, further comprising:

receiving, via the interface, a selection of a cloud region in which to deploy the first production environment; and receiving, via the interface, a selection of a service control list associated with the first production environment, wherein the application is further to deploy the first production environment within the selected cloud region, and with the selected service control list.

9. A computer system, comprising:

one or more processors; and one or more non-transitory computer-readable media storing computer-executable instructions that, when executed by the one or more processors, cause the one or more processors to perform operations comprising:

receiving data via an interface;

updating a cloud environment template based on the data, to create an updated cloud environment template;

receiving a command via the interface to provision multiple cloud deployments associated with the updated cloud environment template;

generating a plurality of executable files associated with a cloud environment provisioning system, based at least in part on the updated cloud environment template; and executing an application to deploy the multiple cloud deployments, via a cloud service provider, based on the updated cloud environment template, wherein the application is configured to contemporaneously execute a first pipeline of the plurality of executable files and a second pipeline of the plurality of executable files.

10. The computer system of claim 9, wherein executing the application comprises:

creating a first storage space associated with a first cloud deployment of the multiple cloud deployments;

creating a second storage space associated with a second cloud deployment of the multiple cloud deployments;

generating a first copy of the plurality of executable files within the first storage space;

generating a second copy of the plurality of executable files within the second storage space;

initiating a first continuous deployment pipeline configured to execute the first copy of the plurality of executable files in the first storage space using a predetermined execution sequence; and initiating a second continuous deployment pipeline configured to execute the second copy of the plurality of executable files in the second storage space using the predetermined execution sequence.

11. The computer system of claim 10, the operations further comprising:

receiving a listing of authorized credentials associated with the first cloud deployment; and configuring a set of access permissions associated with the first storage space, based on the listing of authorized credentials.

12. The computer system of claim 9, wherein executing the application comprises:

determining an existing storage space associated with the cloud environment template;

generating a first subfolder within the existing storage space associated with a first cloud deployment of the multiple cloud deployments;

generating the plurality of executable files within the first subfolder, wherein generating the plurality of executable files comprises copying at least one file from a second subfolder within the existing storage space; and initiating a first continuous deployment pipeline configured to execute the plurality of executable files within the first subfolder using a predetermined execution sequence.

13. The computer system of claim 12, wherein the first subfolder is associated with a production environment, and includes a first configuration file associated with a first security policy or a first network construct associated with the production environment, and wherein the second subfolder is associated with a non-production environment, and includes a second configuration file associated with a second security policy or a second network construct associated with the non-production environment.

14. The computer system of claim 12, the operations further comprising:

initiating the first continuous deployment pipeline, to execute the plurality of executable files within the first subfolder on a first computing device; and initiating a second continuous deployment pipeline configured to execute a second plurality of executable files within the second subfolder, on a second computing device.

15. The computer system of claim 9, the operations further comprising:

receiving, via the interface, a selection of the cloud service provider;

generating the plurality of executable files based at least in part on the selected cloud service provider; and executing, via the application, the plurality of executable files.

16. The computer system of claim 9, the operations further comprising:

receiving, via the interface, a selection of a cloud region in which to deploy a first cloud deployment of the multiple cloud deployments; and receiving, via the interface, a selection of a service control list associated with the first cloud deployment, wherein the application is further to deploy the first cloud deployment within the selected cloud region, and with the selected service control list.

17. One or more non-transitory computer-readable media storing instructions executable by a processor, wherein the instructions, when executed by the processor, cause the processor to perform operations comprising:

receiving data via an interface;

updating a cloud environment template based on the data, to create an updated cloud environment template;

receiving a command via the interface to provision multiple cloud deployments associated with the updated cloud environment template;

generating a plurality of executable files associated with a cloud environment provisioning system, based at least in part on the updated cloud environment template; and executing an application to deploy the multiple cloud deployments, via a cloud service provider, based on the updated cloud environment template, wherein the application is configured to contemporaneously execute a first pipeline of the plurality of executable files and a second pipeline of the plurality of executable files.

18. The one or more non-transitory computer-readable media of claim 17, wherein executing the application comprises:

creating a first storage space associated with a first cloud deployment of the multiple cloud deployments;

creating a second storage space associated with a second cloud deployment of the multiple cloud deployments;

generating a first copy of the plurality of executable files within the first storage space;

generating a second copy of the plurality of executable files within the second storage space;

initiating a first continuous deployment pipeline configured to execute the first copy of the plurality of executable files in the first storage space using a predetermined execution sequence; and initiating a second continuous deployment pipeline configured to execute the second copy of the plurality of executable files in the second storage space using the predetermined execution sequence.

19. The one or more non-transitory computer-readable media of claim 17, wherein executing the application comprises:

determining an existing storage space associated with the cloud environment template;

generating a first subfolder within the existing storage space associated with a first cloud deployment of the multiple cloud deployments;

generating the plurality of executable files within the first subfolder, wherein generating the plurality of executable files comprises copying at least one file from a second subfolder within the existing storage space; and initiating a first continuous deployment pipeline configured to execute the plurality of executable files within the first subfolder using a predetermined execution sequence.

20. The one or more non-transitory computer-readable media of claim 17, the operations further comprising:

receiving, via the interface, a selection of the cloud service provider;

generating the plurality of executable files based at least in part on the selected cloud service provider; and executing, via the application, the plurality of executable files.

* * * * *